May 23, 1950 W. H. WAIT ET AL 2,509,115
FISH TAPE LEADER
Filed July 13, 1946
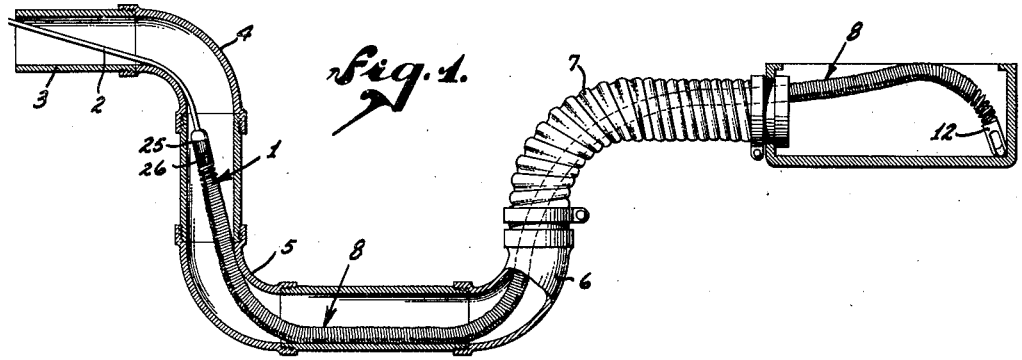
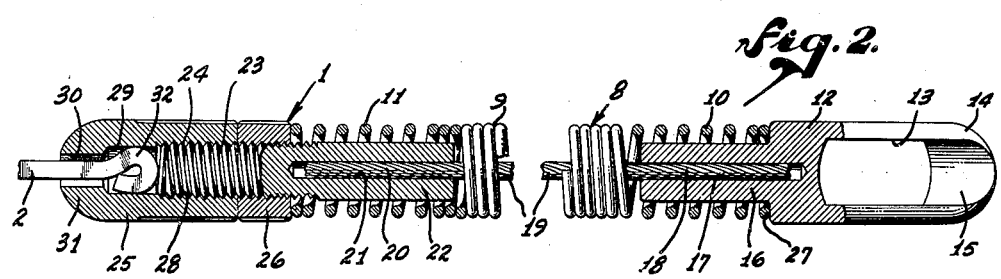
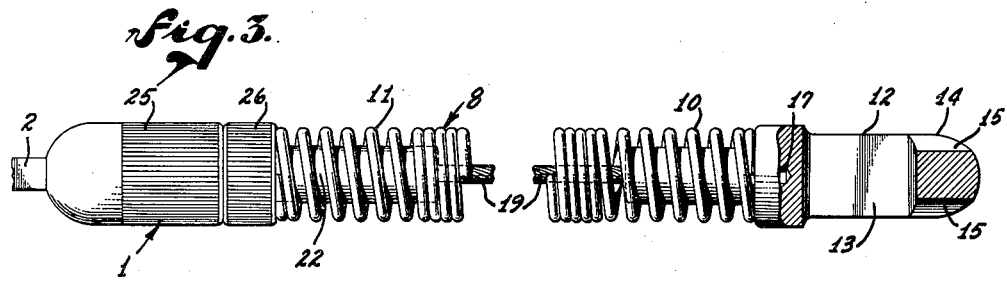
WILLIAM H. WAIT,
WILL CLAUDE JORDAN,
INVENTORS.
BY W. W. Beatty
ATTORNEY.

Patented May 23, 1950

2,509,115

UNITED STATES PATENT OFFICE 2,509,115

FISH TAPE LEADER

William H. Wait and Will Claude Jordan, Burbank, Calif.

Application July 13, 1946, Serial No. 683,554

3 Claims. (Cl. 175—376)

The invention relates to a fish tape leader, for fishing electric wires through a conduit.

At the present time it is customary to employ a fish tape of steel, rectangular in shape and about $\frac{1}{16}$ inch by $\frac{1}{8}$ inch, although other sizes are also used. The tape is pushed through the conduit to the far end thereof and the electric wires are secured to the end of the tape. Then the tape is pulled back to draw the wires through the conduit. This has the objection that such tape while being flexible, is rather stiff and some difficulty and delay are involved in pushing the tape through a conduit having a number of bends.

According to one feature of the present invention, the fishing is made easier by providing, for the end of the tape, a leader which is more flexible than the tape.

According to another feature of the invention, means are provided for attaching the end of the tape to a flexible leader which can be relatively short in length, e. g., of the order of fifteen inches. As the leader is preferably more flexible than the tape, when the tape is pushed forward, the leader will pass along a reverse bend or offset easier than the tape, as the tape has to twist or turn at such locations.

According to a further feature, the invention provides a swivel coupling between the fish tape and the leader to facilitate pulling electric wires through the conduit as the fish tape can rotate or twist in going around bends without causing a twist in the wires being pulled.

For further details of the invention, reference may be made to the drawings wherein:

Fig. 1 is a side view of a leader according to the present invention applied to a conduit shown partly in section.

Fig. 2 is an enlarged sectional view of the leader, with parts broken away.

Fig. 3 is an enlarged side or plan view of the leader with parts broken away and with the head partly in section.

Referring in detail to the drawings, the leader 1 of this invention forms the terminal portion of a fish tape 2. The leader 1 is more flexible than the tape 2 as explained above, whereby it is more readily pushed through a conduit 3 having a number of bends as indicated at 4, 5, 6, and 7.

While other materials and dimensions may be employed all parts of the leader 1 are of metal and for example it may be about 15½ inches long and have a substantially uniform diameter of about ⅜ of an inch. The leader is therefore short in comparison to the length of the usual fish tape.

As shown in Fig. 2, the leader 1 has a steel coil spring 8, the intermediate portion of which has closely spaced coils as indicated at 9, with a wider coil spacing at its ends as indicated at 10 and 11. At one end of spring 8, is a head 12 having a hole 13 therethrough, that receives the electric wire not shown. The outer end 14 of the head 12 may have lengthwise grooves as indicated at 15 to receive the electric wire.

The head 12 has a shank 16 having an axial bore 17 in which is secured one end 18 of a steel cable 19. The other end 20 of cable 19 is secured in the axial bore 21 in the shank 22 of a bolt 23 having threads 24 on its outer end. The cable 19 may be secured in the shanks 16 and 22 by swaging these shanks on the cable in a punch press.

Fitting on the bolt 23 is a tail piece 25 and a lock nut 26. The spring 8 extends between the lock nut 26 and a shoulder 27 on the head 12, with the shanks 16 and 22 inside of spring 8 and with the cable 19 co-axial with the spring 8.

The tail piece 25 outwardly of the threaded bore 28, has a smooth bore 29 which leads into a smaller hole 30 extending through the outer end 31 of the tail piece.

When it is desired to attach the leader 1 to the end of a fish tape, the tail piece or cap 25 is removed from the bolt 23 and the straight end of the fish tape is inserted from left to right, with reference to Fig. 2, through the hole 30. Then a blow torch is employed to heat the end of the fish tape until it is cherry red to remove its temper and with a pair of pliers the end is curled as indicated at 32 in Fig. 2, so that the curl will fit and turn in the recess 29. The recess 29 thus forms a socket in which the curl can swivel to provide a swivel coupling. Then the lock nut 26 may be advanced to the right to compress the spring 8, the cap 25 is threaded on the bolt as far as it will go, and the lock nut 26 is backed off slightly to lock the cap 25, preferably with the spring 8 under some compression against head 12 so that it is more rigid than it would be if there were loose play at its opposite ends.

The bolt 23 is long enough so that the curl 32 can not uncurl when considerable tension is applied to the tape 2. Also the uncurling is resisted by the side wall of the recess 29. Experience has shown that the leader 1 will stand a pulling test of more than 480 pounds.

The shanks 16 and 22 serve as pilots and maintain a uniform diameter of the leader when it is flexed, thereby preventing the ends of the spring 8 from shifting laterally from their centered positions shown in Fig. 2.

It will be apparent that various modifications may be made in the invention without departing from the spirit of the following claims.

We claim:

1. A leader for a fish tape, said leader comprising a head having an opening through its outer end, and a shank on its inner end, a cable secured at one end in said shank, a bolt having a shank, the other end of said cable being secured in said bolt shank, a tail piece and lock nut both having threads for removable engagement with said bolt, a coil spring around said cable and extending between said lock nut and said head, said lock nut being adjustable on said bolt to hold said spring under compression against said head, the outer end of said tail piece having an intermediate smooth internal bore opening into a smaller axial hole through the outer end of the tail piece, said hole and said intermediate bore providing a rotatable support for the tape and a curl at the end of the tape respectively, said hole being smaller than said curl.

2. A leader for a fish tape, said leader comprising a flexible member having a tail piece, said tail piece having a bore therethrough larger than the tape, said bore having an outer portion smaller than a curl at the end of the fish tape to prevent lengthwise separation of the fish tape from said leader, said bore having an enlarged inner portion and said bore comprising a rotatable support for the fish tape and its curl, the inner end of said enlarged bore being provided with threads and its outer end being unthreaded and forming a socket for said curl, said unthreaded enlarged bore being of less length than the length of the tape forming said curl and cooperating with said smaller outer bore portion to prevent said curl from uncurling when tension is applied to said fish tape.

3. The combination of a comparatively long steel fish tape having a certain stiffness, and a comparatively short flexible leader of the order of 15 inches in length therefor having less stiffness, said leader having a head having securing means for the electric wire, and said leader having a removable tail piece having a bore therethrough larger than the tape, said bore having an outer portion smaller than a curl at the end of the fish tape to prevent lengthwise separation of the fish tape from said leader, said bore having an enlarged inner portion and said bore comprising a rotatable support for the fish tape and its curl, the inner end of said enlarged bore portion being provided with threads, while its outer end is unthreaded and forms a socket for said curl, said unthreaded enlarged bore portion being of less length than the length of the tape forming said curl and cooperating with said smaller outer bore portion to prevent said curl from uncurling when tension is applied to said fish tape.

WILLIAM H. WAIT.
WILL CLAUDE JORDAN.

REFERENCES CITED

The following references are of record in the file of this patent:

UNITED STATES PATENTS

| Number | Name | Date |
| --- | --- | --- |
| 400,958 | Seely | Apr. 9, 1889 |
| 1,593,185 | McCaffrey | July 20, 1926 |
| 1,730,993 | Buchanan | Oct. 8, 1929 |
| 1,858,997 | Lewin | May 17, 1932 |